(12) United States Patent
Ullman et al.

(10) Patent No.: US 10,099,793 B2
(45) Date of Patent: Oct. 16, 2018

(54) DISTRIBUTED ELECTRIC DUCTED FAN WING

(71) Applicants: David G. Ullman, Independence, OR (US); Vincent Homer, Independence, OR (US)

(72) Inventors: David G. Ullman, Independence, OR (US); Vincent Homer, Independence, OR (US)

(*) Notice: Subject to any disclaimer, the term of this patent is extended or adjusted under 35 U.S.C. 154(b) by 83 days.

(21) Appl. No.: 15/374,771

(22) Filed: Dec. 9, 2016

(65) Prior Publication Data

US 2017/0190436 A1     Jul. 6, 2017

Related U.S. Application Data

(60) Provisional application No. 62/274,202, filed on Jan. 1, 2016.

(51) Int. Cl.
| | |
|---|---|
| *B64D 27/24* | (2006.01) |
| *B64D 31/06* | (2006.01) |
| *B64C 3/32* | (2006.01) |
| *B64D 29/02* | (2006.01) |
| *B64C 21/00* | (2006.01) |

(52) U.S. Cl.
CPC .............. *B64D 27/24* (2013.01); *B64C 3/32* (2013.01); *B64C 21/00* (2013.01); *B64D 29/02* (2013.01); *B64D 31/06* (2013.01); *Y02T 50/166* (2013.01); *Y02T 50/44* (2013.01); *Y02T 50/64* (2013.01)

(58) Field of Classification Search
CPC ........ B64D 27/24; B64D 29/02; B64D 31/06; B64C 3/32; B64C 3/44
See application file for complete search history.

(56) References Cited

U.S. PATENT DOCUMENTS 3,018,983 A * 1/1962 Davidson .............. B64C 23/005
                                                                                               244/15

OTHER PUBLICATIONS

"Electric Aircraft", retrieved from Wikipedia. Archived Dec. 22, 2015.*

* cited by examiner

*Primary Examiner* — Mussa A Shaawat
*Assistant Examiner* — Michael V Kerrigan (57) ABSTRACT

The Distributed Electric Ducted Fan Wing concept incorporates multiple electric ducted fans on lifting surfaces configured to provide integrated aerodynamics and propulsion resulting in enhanced aerodynamic characteristics and thus aircraft performance. The concept uses a plurality of electric ducted fans (EDFs) to not only provide thrust, but to also blow air across the upper surface of a substantial portion of the lifting surface area increasing lift at little loss in efficiency. Not only can the total lift on the surfaces be enhanced, but the lift distribution managed: to aid in aircraft control; ameliorate the effects of turbulence: reduce shed vortices; mitigate the effects of system failures; eliminate stalls; and compensate for crosswinds. This concept offers the potential for increasing electric airplane efficiency and performance, enhancing Short Takeoff and Landing (STOL) capabilities, improving passenger comfort, and reducing the structural stress and cost of aircraft.

13 Claims, 11 Drawing Sheets

DISTRIBUTED ELECTRIC DUCTED FAN WING

CROSS REFERENCE TO RELATED APPLICATIONS

This utility application claims the benefit of U.S. Provisional Patent Application No. 62/274,202, filed on Jan. 1, 2016.

FIELD OF THE DISCLOSED TECHNOLOGY

The disclosed innovation relates to the integration of thrust and aerodynamics for electrically powered airplanes.

BACKGROUND

To date, electric airplane design efforts have focused on replacing small internal combustion engines on motor gliders and ultra light airplanes and with a single electric motor of near equal power. However, electric propulsion offers an opportunity to redesign the aircraft itself and distribute the power about the airframe synergistically enhancing the aerodynamics. Where internal combustion engines are complex and need to be large for efficiency, electric motors are simple and many small ones can be used. The question is; how to make the best use of this distributed potential? This concept directly addresses this question and adds capabilities not possible with a single or a small number of internal combustion engines or electric motors.

This concept builds on three technologies: 1) electric ducted fans, 2) upper surface flow enhancement and 3) distributed propulsion of aircraft. These are combined in a novel way to achieve benefits not foreseen by those separately; specifically, improved aerodynamics and control of span-wise lift distribution. The following is a brief description of the relevant technologies.

A ducted fan is a propulsion system where a mechanical fan, which is a type of propeller, is mounted within a cylindrical shroud or duct.

In recent years, electrically powered ducted fans (EDFs) have been developed for radio controlled model airplanes. They have become commonly available ranging in size from 30 mm to 120 mm, with power up to 15 hp (11 kw). The efficiency of these units has increased over time and continues to evolve with both motor and rotor improvements.

In 2014 Airbus announced its development of the E-Fan, a single passenger airplane, powered by two electrically powered ducted fans mounted on the sides of the fuselage aft of the wing. According to Airbus, EDFs offer many advantages. The first is higher efficiency than an open propeller below 100-110 mph, with 80% propulsion efficiency (percent of delivered mechanical power that is converted to thrust). Another advantage is smaller size than a comparable propeller, while noise is reduced. Additionally, EDFs offer protection of ground personnel when the engine is running.

Most of the lift generated by an airfoil is caused by an increase in the flow velocity over the upper surface. Willard Custer explored enhancing the lift by wrapping the wing around the lower half of the propeller arc with his "Custer Channel Wing" aircraft. He was able to show improved short take-off and landing (STOL) capabilities with his aircraft.

Where Custer used the propeller to accelerate the air over the upper surface of his "channels", another approach is to use a "blown upper surface", a wing with air or other gas released through a slot in the upper surface generally in the direction of airflow to enhance the lift characteristics of the wing while providing thrust. There is a long history of blown upper surface technologies leading through the Bartoe/Bell-Jetwing and culminating in the 1980s with the development of the Boeing YC-14.

The Bartoe/Bell-Jetwing featured a single jet engine mounted in the fuselage with its exhaust ducted to 70% of the trailing edge of the wings providing thrust and augmenting the lift by increasing the air velocity over the wing. This jet powered aircraft could fly at 350 mph and yet remained controllable to airspeeds as low as 40 mph, landing in less than 300 ft.

The Boeing YC-14 featured two jet engines, one over each side of a high wing, positioned close to the fuselage blowing their exhaust over a small span of the upper surface. The Jetwing, the YC-14, and similar experimental aircraft increase air velocity over a portion of the top surface of the wing to not only improve the airfoil's lift curve slope, but raising the maximum lift coefficient. Additionally, the use of flaps on the trailing edge of the wing with the blown air flow going over them, further enhances the lift. Using these techniques, the YC-14 was able to provide exceptional STOL performance.

Distributed propulsion is the integration of the airflows and forces generated by the propulsion system over a large portion of the aircraft in such a way as to improve the vehicle's aerodynamics, and propulsive and structural efficiencies. Historically, gains in aircraft performance through distributed propulsion were outweighed by complexity when using traditional power plants.

The Bartoe/Bell Jetwing had distributed propulsion as did the Hunting H.126 flown in the 1960's. It diverted almost 60% of its jet engine thrust across its wing's trailing edge to achieve lift coefficients up to a theoretical 7.5 and an operational 5.5, far above that possible without the jet flap. The aircraft was an experimental platform and not a practical vehicle and was abandoned.

A resurgence in interest in distributed propulsion has been fueled by the potential for many small electric motors as a replacement for a few large internal combustion or jet engines; and advances in computational and experimental tools along with new technologies in materials, structures, and aircraft controls, etc. enabling a high degree of integration of the airframe and propulsion system in aircraft design. This integration allows the potential of synergistic coupling of airframe aerodynamics and the propulsion by distributing thrust using many propulsors on the airframe to drastically reduce aircraft related fuel burn, emissions, and noise.

Most recently, distributed propulsion has focused on two areas. Firstly; NASA, DARPA and many contractors have led the study of distributed propulsion on large, high speed airplanes for use as airliners and cargo transport. Secondly, NASA is leading an effort aimed at small, low speed business, passenger, and general aviation aircraft. The large passenger and transport configurations have tended toward blended-wing body configurations with the distributed propulsors arranged on the upper rear of the center section of the airplane to ingest the boundary layer.

A smaller aircraft is the LEAPTech (funded by NASA), now called "Maxwell" or the X-57. It is scheduled for flight testing spring 2018. This aircraft has 14 small electric motors on the leading edge of the wing each powering a propeller. Each propeller can fold when its motor is shut down. In this way, all the motors are propelling the airplane on takeoff and some motors shut down for cruise. Using the distributed propulsion with the increased air velocity over its wing, the X-57 will have a much smaller wing than a similar airplane using a single engine. This leads to lower induced and parasite drag resulting in higher flight efficiency—increased speed and range on less energy.

A limitation of the X-57 configuration is that the integration of propulsion with aerodynamics is purely in terms of increasing the speed of the air over both the top and bottom of the wing. This does not take full advantage of the blown upper surface potential. Additionally, due to propeller swirl, the angle of attack of air flowing over wing is not uniform over the wing span. In fact, the wing sees three different flow fields: 1) span not affected by a propeller, 2) span affected by the downward motion of the propeller, and 3) span affected by upward motion of the propeller. The resulting uneven angle of attack over the span of the wing means that not all sections are flying with the same efficiency in terms of the lift and drag produced. A final limitation is that a majority of the propulsors are shut down during cruise thus nullifying any potential for propulsion-aerodynamic integration during a majority of the flight envelope.

SUMMARY OF THE INNOVATION

The present innovation combines the above-described technologies as well as others to achieve more than the sum of the combined previous technologies. The instant innovation combines multiple electric ducted fans (EDFs) with a control system to tailor the lift distribution over the upper surfaces of one or both wings and other airfoils of an aircraft. According to the instant innovation, the EDFs may not only power the airplane, but also enhance and control the aerodynamic forces on the lifting surfaces in a controllable fashion. According to the instant innovation, each electric ducted fan (EDF) accelerates air through a duct that is formed aft of each EDF to distribute the airflow as a stream of high velocity air on the upper surface of the airfoil. This high velocity flow dramatically increases the airfoil's lift allowing the airplane to fly in a lower drag configuration. The instant innovation comprises a myriad of small, distributed ducted fans providing controlled aerodynamic forces to a substantial portion of the span of the lifting surfaces.

Specifically, the instant innovation allows for more precise control of the aircraft compared to the state-of-the-art. Specifically, instant innovation may provide for control in pitch, bank and yaw without the need for control surfaces. In addition, the effects of turbulence may be mitigated, due to correction of sudden accelerations due to turbulent air. Shed vortices may be reduced as well. System failures may also be mitigated, such as elimination stalling due to engine failure. The instant innovation may also provide for compensation for cross wind during takeoff and landing. Finally, the instant innovation may also allow reduced airframe weight due to reduction of stresses on lifting surfaces, and reduced initial and operating costs.

DETAILED DESCRIPTION

Figure 1:
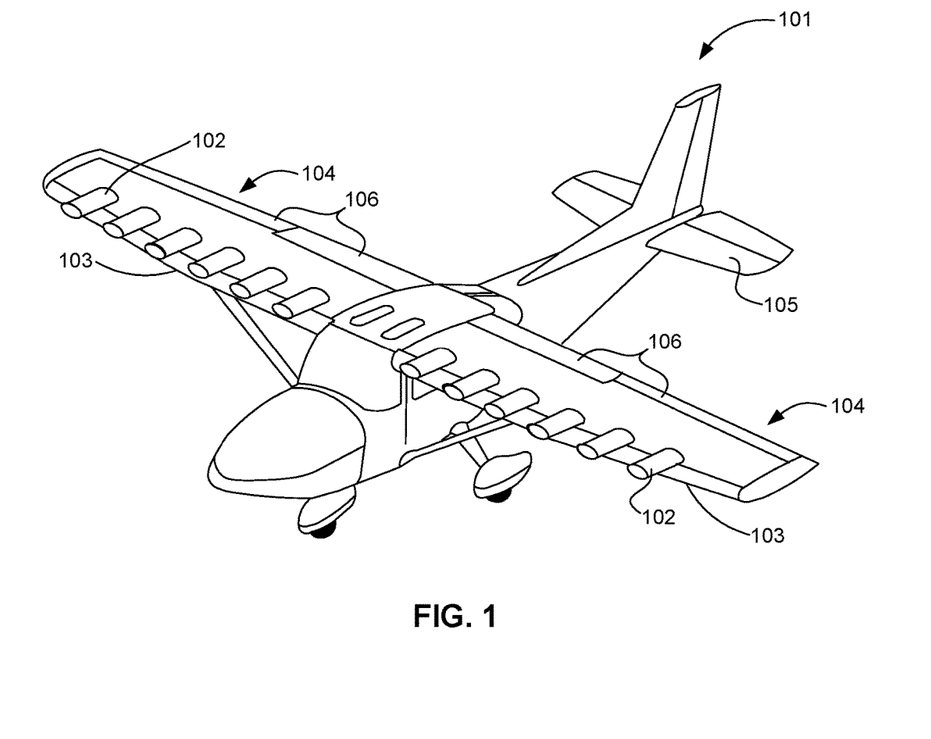
FIG. 1. An example of an airplane having multiple innovative electric ducted fan (EDF) installations positioned on each wing and optionally on the horizontal tail.

In FIG. 1, airplane 101 has multiple electric ducted fan (EDF) installations 102 positioned near the leading edges 103 of each aerodynamic lifting element such as wing 104, as shown in FIG. 1, and in some embodiments, on horizontal tail 105. The wing 104 and other horizontal surfaces (e.g., horizontal tail 105) may be mounted high, shoulder or low vertical positions with respect to the fuselage, and may be of traditional wing-forward-tail-aft, canard or tandem configuration. In this shown embodiment, airplane 101 has a high wing 104, horizontal tail 105 aft, and multiple electric ducted fan installations 102 mounted on wing 104 near leading edges 103. Optionally, the wing 104 and other horizontal surfaces may have movable trailing edge surfaces 106 that alter cross-sectional shape or planform of the surface.

Figure 2A:
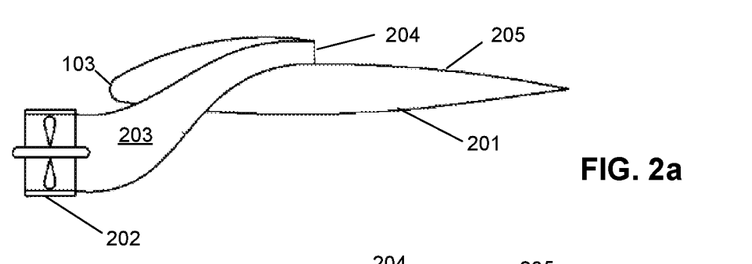
FIG. 2a. Cross sectional view of an embodiment of a cross section of one innovative EDF installation with the EDF mounted below the wing center line.
Figure 2B:
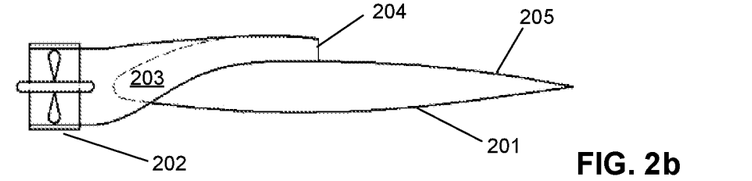
FIG. 2b. Cross sectional view of an embodiment of a cross section of one innovative EDF installation with the EDF mounted near the center line of the wing.
Figure 2C:
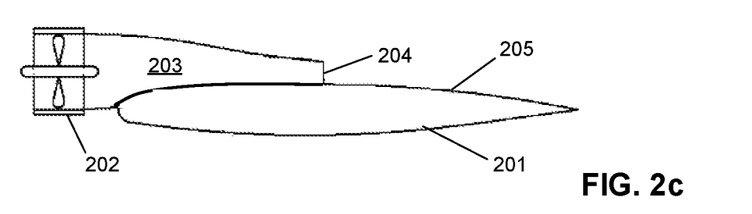
FIG. 2c. Cross sectional view of an embodiment of a cross section of one innovative EDF installation with the EDF mounted above the wing center line.
Figure 2D:
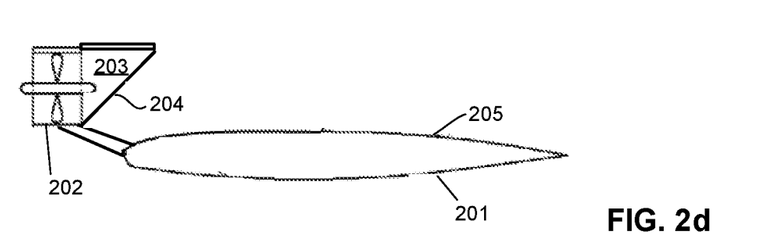
FIG. 2d. Cross sectional view of an embodiment of a cross section of one innovative EDF installation with the EDF mounted above the wing center line and separate from the wing structure.

Four representative embodiments of a cross section of an electric ducted fan installation 102 are shown in FIGS. 2a-d. In embodiments of the disclosure, each electric ducted fan installation 102 is positioned to direct the air blown by Electric Ducted Fan (EDF) 202 aftward over upper aerodynamic surface 205 of airfoil section 201 of an aerodynamic lifting element, such as wing 104 in FIG. 1. In each ducted fan installation 102, an EDF 202 accelerates the air into a channel 203 to be then guided by a nozzle 204 across the upper aerodynamic surface 205 of airfoil section 201 of an aerodynamic lifting element, such as wing 104 in FIG. 1. Channel 203 is the fixed portion and the nozzle 204 is any moving portion controlled to direct the air from the EDF 202 over the upper aerodynamic surface 205. The use of a controlled nozzle is optional and may be required for some embodiments. FIG. 2a shows a particular embodiment with EDF 202 integrated into [[the]] an isolated airfoil section 201, disposed at leading edge 103 with airflow directed by channel 203 to the optional nozzle 204 to be aftward directed on the upper aerodynamic surface 205. In some embodiments the EDF 202 may be disposed below the center line of airfoil section 201, FIG. 2a, even with it, FIG. 2b, or above it, FIG. 2c. In some embodiments the electric ducted fan installation 102 may be disjoint from airfoil section 201 as shown in FIG. 2d. In some embodiments the channel is a closed section as indicated in FIGS. 2a, 2b and 2c, and in others an open section as indicated in FIG. 2d.

Figure 3:
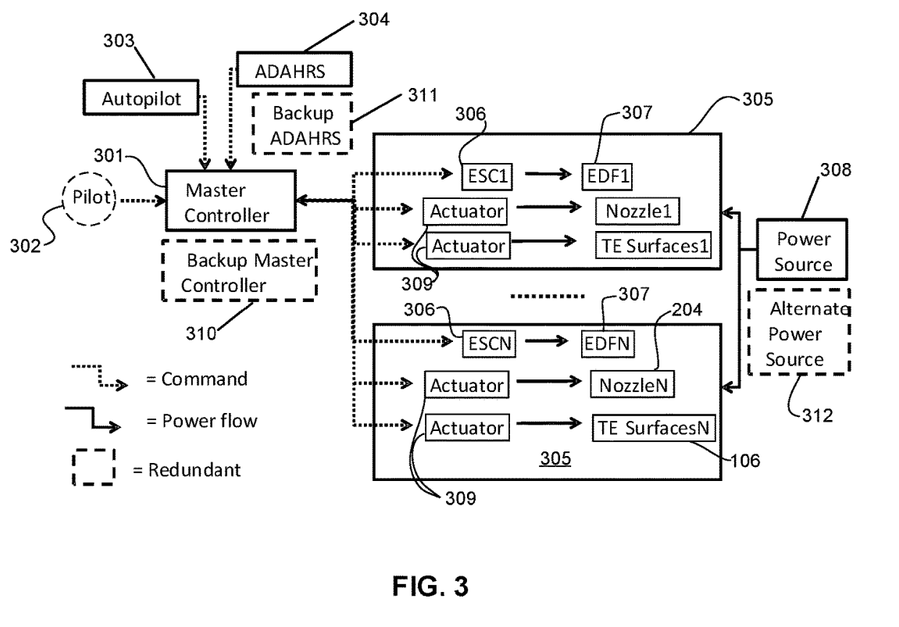
FIG. 3. Block diagram of an embodiment of the operational control system.

In FIG. 3, an embodiment of an operational control system represented as a block diagram. Control is managed by master control unit 301. In one embodiment, the control system comprises a single master control unit 301 as shown in FIG. 3. In other embodiments, the control system comprises two or more redundant backup master controller units 310, each backup master controller unit 310 comprising a duplicate master controller unit, as indicated by the dashed box 310 in FIG. 3.

Referring to FIG. 3, master control unit 301 comprises one or more inputs and one or more outputs. In some embodiments, one or more inputs to master controller unit 301 communicate with human-machine interface 302, which, by way of example, may be a control panel manually operated by a human pilot of the aircraft. A number of digital and analog signals may be generated by the human-machine interface. In some embodiments, one or more inputs to master controller unit 301 communicate with autopilot system 303. In some embodiments, autopilot system 303 may comprise a conventional autopilot found onboard many aircraft and known to persons skilled in the art. Conventional autopilot systems comprise functions that command aircraft to hold altitude and heading, or similar flight desires. In other embodiments, autopilot system 303 comprises more functions than found in a conventional autopilot system. These extra functions provide enhanced capabilities over and above conventional autopilots for controlling flight parameters that affect ride quality, vortex dissipation and other features described below.

In some embodiments, one or more inputs to master controller 301 communicate with at least one Air Data/Attitude/Heading Reference System (ADAHRS) unit 304. As known in the art, an ADAHRS unit, such as that indicated by 304, comprises a plurality of micromachined electromechanical systems (MEMS) sensors, including accelerometers, gyroscopes and magnetometers on all three axes that measure aircraft and system data such as yaw, pitch and roll, as well as speed, attitude, and acceleration rates. ADAHRS unit 304 may comprise a microprocessor that communicates with the plurality of MEMS sensors, collects and processes signals from the individual sensors, may store the digitized data, then send the data to master controller unit 301. FIG. 3 shows one embodiment having a single ADAHRS unit 304. Other embodiments may comprise redundant backup ADAHRS units 311, each redundant backup unit 311 comprising a single ADAHRS unit. This is indicated in FIG. 3 by the dashed box.

In typical embodiments, master controller unit 301 manages a plurality of EDF installations 305. Referring again to FIG. 3, master controller unit 301 comprises one or more outputs that communicate with one or more EDF installation interfaces 305. Each EDF interface 305 comprises an electronic speed controller (ESC) 306 and a plurality of actuators 309. Firstly, master controller unit 301 commands at least one electronic speed controller (ESC) 306, controlling the speed of each EDF fan 307. In some embodiments, ESC 306 modulates energy supplied by power source 308 as commanded by master controller 301. Power source 308 may comprise batteries, a fuel cell, an engine/generator or other electrical energy source. Further, power source 308 may have one or more backups 312 as shown indicated by dashed box in the block diagram of FIG. 3. In some embodiments, each backup 312 may simply be a reconfiguration of the power sources in 308 to supply the required power to the EDFs.

In typical embodiments, each ESC 306 comprises sensors that measure the state of the EDF 307 under its control, such as its rpm, power utilized or air flow rate, and sends the information back to master controller unit 301. In this way, master controller unit 301 also receives information on the state of each EDF 307 from each ESC 306, and combines this information with that from the ADAHRs 304 to respond to commands from human pilot 302 or autopilot 303.

In some embodiments, master controller unit 301 may also command one or more actuators controllers 309 that communicate with actuators control the geometry of each said EDF nozzle 204 or trailing edge surface 106 to modify the airflow from the EDF over the upper aerodynamic surface. The combination of the EDF setting with the nozzle and trailing edge surfaces allow the lift and thrust distribution on the wing to be tailored to suit the flight requirements.

Figure 4:
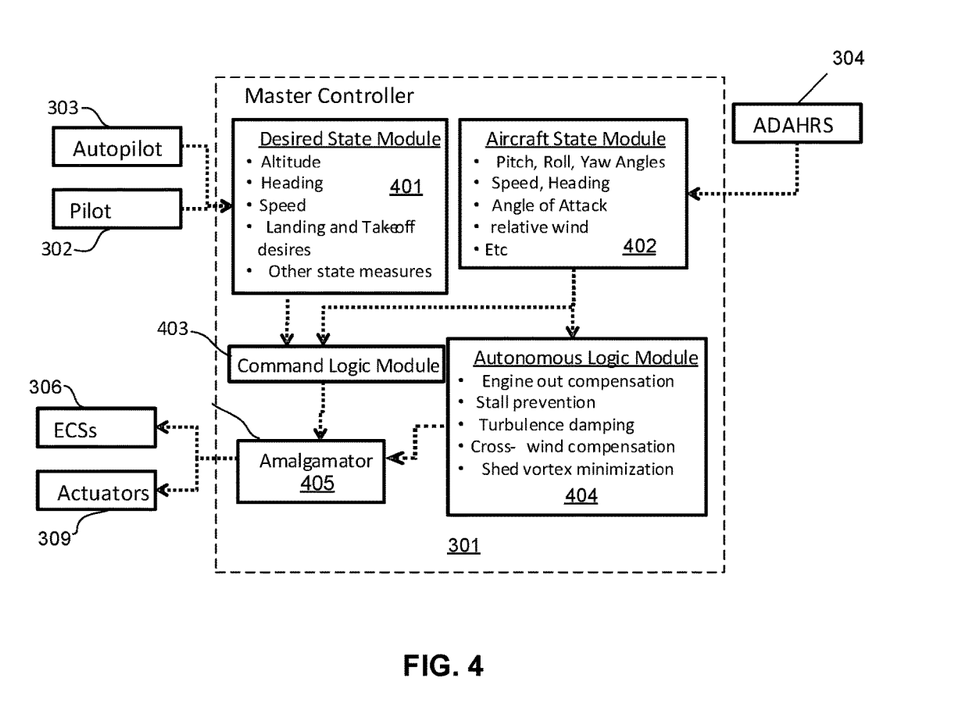
FIG. 4. Block diagram of an embodiment details of the master control unit.

Referring to FIG. 4, the master control unit 301 is detailed. In some embodiments, master control unit 301 has five major subsystems. Inputs from the pilot 302 and autopilot 303 are combined in the Desired State Module 401 to define the preferred aircraft situation in terms of altitude, heading, speed, landing and take-off desires and other desired state measures. In some cases, this desired state is input solely from the pilot (e.g., manually) and the autopilot is turned off. In other cases, the pilot is inactive and is relying solely on the autopilot for control of the aircraft and is not providing input. At times both the pilot and autopilot are providing input and the logic in the Desired State Module combines them to develop a single desired state.

The Aircraft State Module 402 accepts input from the ADAHRS 304 and, based on this input, computes information for comparison to the desired state developed in the Desired State Module 401 where this comparison occurs in the Command Logic Module 403. It may also compute, from the ADAHRS 304 input information needed by the Autonomous Logic Module 404.

The Command Logic Module 403 compares the desired state from the Desired State Module 401 with the actual state form the aircraft state module 402 to determine the needed change in the aircraft control to have the two states match. The aircraft control is provided by changes to the power to the ESC 307 and actuators' 309 settings.

The actual state of the aircraft is also provided by the Aircraft State Module 402 to the Autonomous Logic Module 404. The information provided is used to determine ESC 306 and actuator 309 changes needed to maintain desired autonomous states. In this embodiment five autonomous functions are itemized: engine out compensation, stall prevention, turbulence damping, cross-wind compensation and shed vortex minimization. Other autonomous functions may be integrated into the Autonomous Logic Module 404.

The Command Logic Module 403 and the Autonomous Logic Module 404 both supply their control desires to the Amalgamator 405 that uses its internal logic to control the ECSs 306 and actuators 309. to best achieve the desired state and the autonomous functions.

Figure 5:
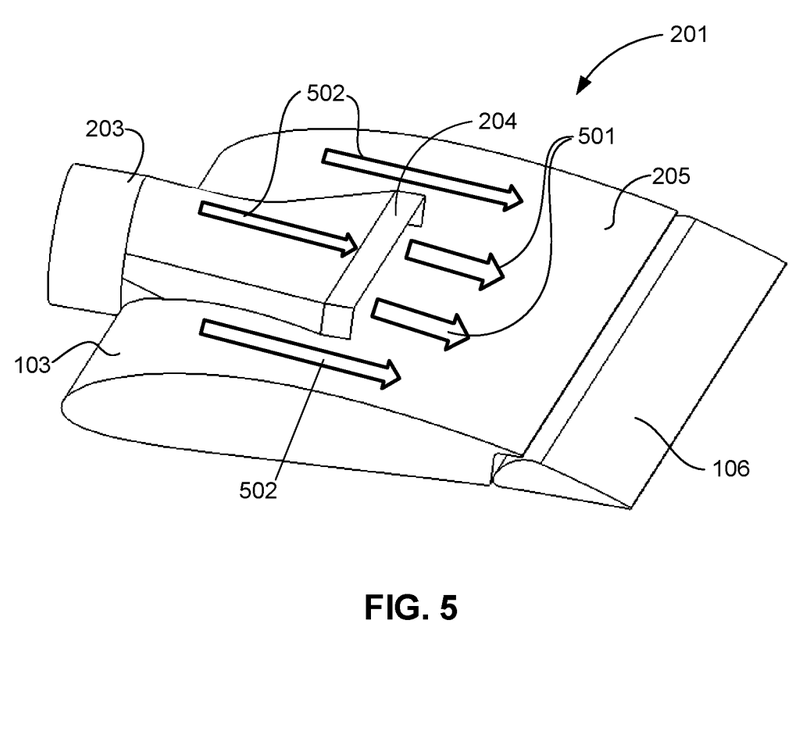
FIG. 5. Perspective view of a wing section showing the geometry of the channel and nozzle shaping the airflow emanating from the nozzle of an EDF and entraining additional flow.

As demonstrated above, the geometry of channel 203 and nozzle 204 shapes the airflow emanating from nozzle 204 and creating low pressure on upper aerodynamic surface 205. As shown in FIG. 5, airflow 501 from nozzle 204 also entrains airflow 502 upstream of nozzle 204, increasing its velocity over upper aerodynamic surface 205 and thus the lift created by it on airfoil section 201. Exhaust airflow 501 also may entrain airflow 503 flowing from leading edge 103 on either side of nozzle 204 toward trailing edge 106, increasing its velocity and subsequent lift. The degree to which airflow 503 is entrained depends on the shape of nozzle 204. These two entrainments retard flow separation at high angles of attack delaying stall and spread the effect of the EDF over a span of the lifting surface. Although not shown, the above pertains even if the channel and nozzle are above the upper aerodynamic surface as shown in FIG. 2c or separate from it as in FIG. 2d.

Figure 6:
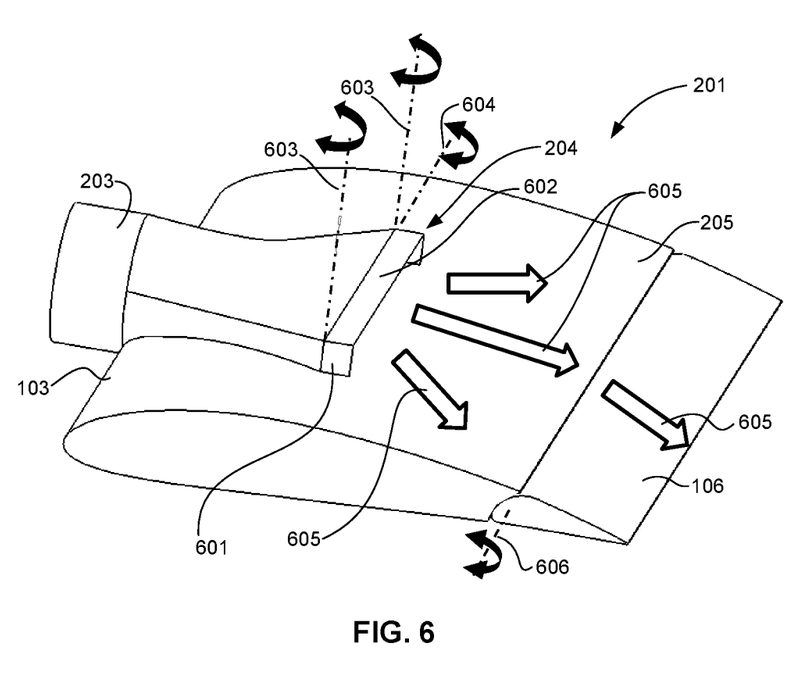
FIG. 6. Perspective view of a wing section showing how adjusting the nozzle about the horizontal axis or the vertical axis and adjusting the trailing edge elements shapes the airflow emanating from the nozzle.

In the embodiment represented in FIG. 6, the shape of nozzle 204 can be optionally and independently controlled by an actuator (e.g., actuator 309 in FIG. 3) to rotate nozzle flaps 601 and 602 about axes 603 and 604, respectively. Rotation of nozzle flaps 601 and 602 may widen or narrow the exhaust flow 605 emanating from nozzle 204 and flowing over upper aerodynamic surface 205. Widening and narrowing of exhaust flow 605 changes the spread of exhaust flow 605 over upper aerodynamic surface, and thus the width of airfoil section 201 aft of nozzle 204 that is blown by exhaust flow 605. The thrust and lift profiles over upper aerodynamic surface 205 of airfoil section 201 may be optimized in this manner to suit flight conditions.

In some embodiments, trailing edge surface 106 is aft of each EDF. In some embodiments, trailing edge surface 106 is controlled to move about axis 606. In some embodiments, trailing edge surface 106 is a flap that is deflected downwards about axis 605. In alternate embodiments, trailing edge surface 106 is an aileron that can be deflected both upwards and downwards about axis 606. Deflection of these surfaces redirects the exhaust flow 605 (indicated by the large arrows) over upper aerodynamic surface 205 of airfoil section 201, vertically modifying the lift and thrust effectiveness of upper aerodynamic surface 205. Changes in the geometry of nozzle 204 made by actuating rotation of nozzle flaps 601 and 602 about the vertical axis 603 spreads the EDF exhaust flow 605 (indicted by the arrows) spanwise, affecting the horizontal lift and thrust distributions. Similarly, but independently, changing the nozzle geometry by actuating motion about axis 604 also shapes the EDF flow out of nozzle 204, affecting the vertical lift and thrust distributions.

Figure 7:
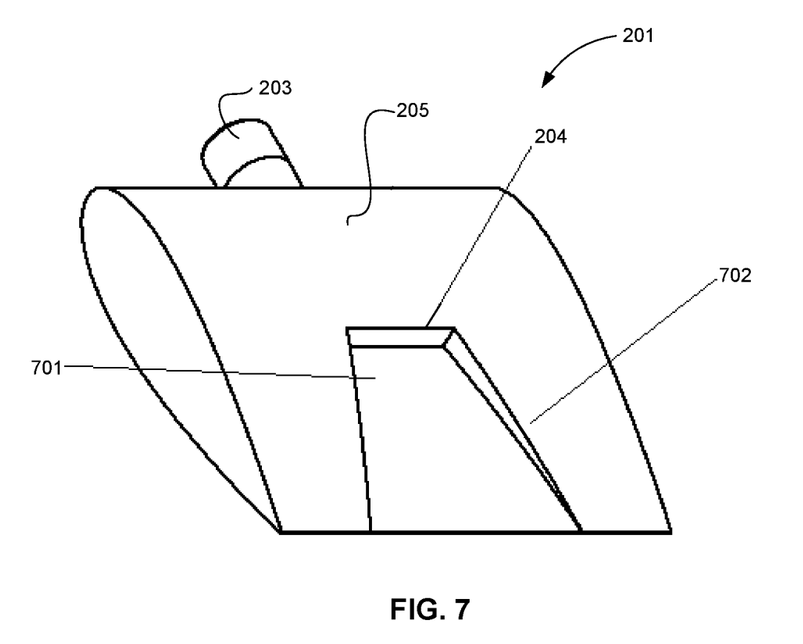
FIG. 7. Perspective view of a wing section showing the geometry of a trough of the nozzle shaping the airflow emanating from the nozzle of an EDF.

In some embodiments, as exemplified in FIG. 7, airfoil section 201 comprises trough 701 aft of nozzle 204 to direct the EDF exhaust from nozzle 204 aft over upper aerodynamic surface 205. In some embodiments, trough 701 distributes the exhaust spanwise over the upper surface of the wing or airfoil by widening as is progresses aft. Spanwise distribution enables the flow of each ducted fan to be dispersed through trough 701 to enhance an airfoil section that is wider than the fan diameter or nozzle 204 itself so that each EDF can influence the flow over a greater portion of the lifting surface or even the entire span. If used, trough 701 may have sharp edges 702 as drawn or may be blended into the upper aerodynamic surface. The angle that trough 701 makes with the chord line of the airfoil can be designed for best performance. In some embodiments, trough 701 need not be straight sided as shown, but may take other shapes to enhance performance.

Figure 8:
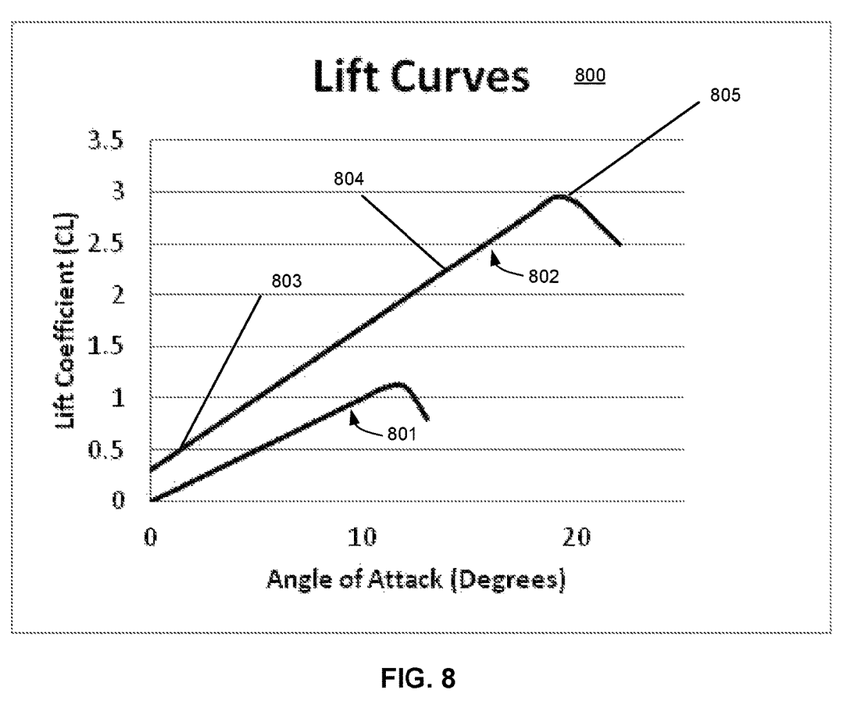
FIG. 8. Lift curves for a section of a wing. These plots show the lift coefficient versus the angle of attack emphasizing how the innovation affects the lift curve.

FIG. 8 illustrates graph 800 that displays lift curves 801 and 802 for a section of a wing, according to some embodiments. These plots show the lift coefficient versus the angle of attack. A wing section without distributed electric ducted fans has a lift curve 801 that is characterized by $C_{L0}$, the lift coefficient when the angle of attack is zero, the lift curve slope and the maximum lift coefficient, $C_{Lmax}$. A wing section with EDFs present exhibits a lift curve 802 having different values of $C_{L0}$, slope and $C_{Lmax}$ compared to a wing section lacking EDFs (801). Specifically, the $C_{L0}$ value 803, lift curve slope 804 and maximum lift 805 are all increased relative to like parameters of lift curve 801. The exact shape of the enhanced curve is a function of how the exhaust from the EDF is molded by the channel 203, the nozzle 204, the optional trough 701, the air entrainment, and the trailing edge surfaces 106 as it flows over the upper aerodynamic surface 205.

Figure 9:
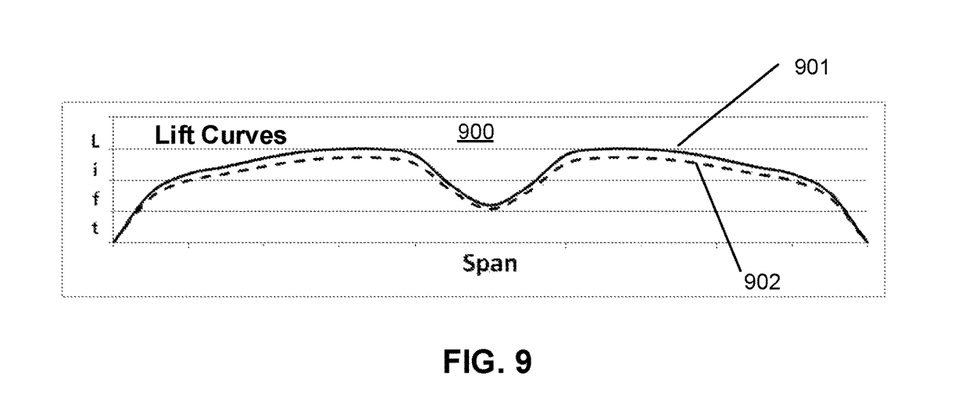
FIG. 9. Curves showing how the master controller system can alter the lift distribution across entire aerodynamic surface span.

FIG. 9 illustrates graph 900 that displays lift curves 901 and 902 for a section of a wing, according to some embodiments. In FIG. 9, the spanwise distribution of lift, as characterized by lift curve 901 greatly affects the performance and control of an aircraft. Generally this lift characteristic is formed by the shape of the lifting surface and modifications to it with leading edge and trailing edge surfaces. For this innovation, it can also be tailored by the EDF installations to optimize for different flight conditions. This reshaping can be in real time response to pilot or autopilot controls, gusts sensed or the need to manage the shed vortex. For example, if an updraft is sensed, the lift distribution can be reduced, as demonstrated by lift curve 902, to compensate for the effect of the updraft on the airfoil, resulting in a smoother ride for passengers. This may be accomplished by master controller 301 altering the power to EDFs 307, or by the configuration of the nozzle or trailing edge surfaces through commands to actuators 309. Additionally, by oscillating between the states such as shown by lift curves 901 and 902 at the proper frequency, the trailing vortex can be excited and dissipated.

Figure 10:
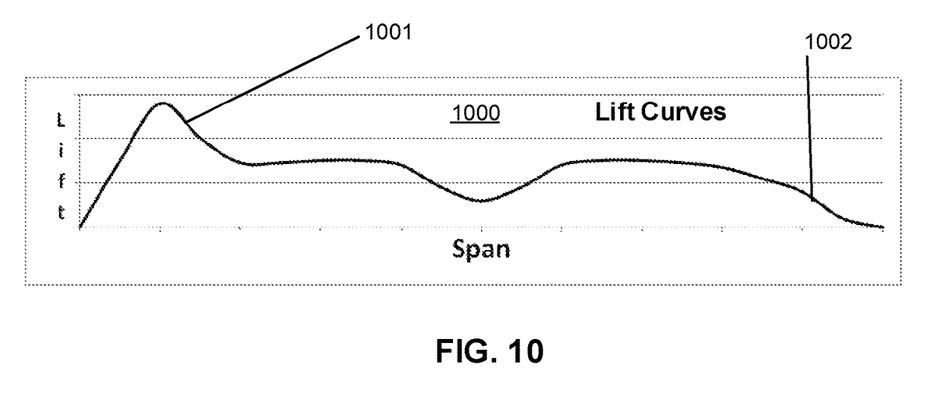
FIG. 10. Curve representing lift distribution across entire wing span, showing differential management of lift distribution, aiding in functions such as banking.

FIG. 10 illustrates graph 1000 that displays lift curves 1001 and 1002 for a section of a wing, according to some embodiments. As depicted in FIG. 10, functions such as banking can be managed by changing the spanwise lift distribution on one wing 1001 relative to the other wing 1002. By way of example, an EDF installation on one wing 1001 has been changed by a command from the pilot 302 or autopilot 303 to master controller 301, which in turn has commanded an increase in lift on one wing and a decrease the lift on the other, resulting in a banking of the aircraft. These changes can be accomplished by changing the power supplied to a specific fan, or to multiple EDFs 307 by the ESCs 306, or altering the nozzles or trailing edge surfaces.

Figure 11:
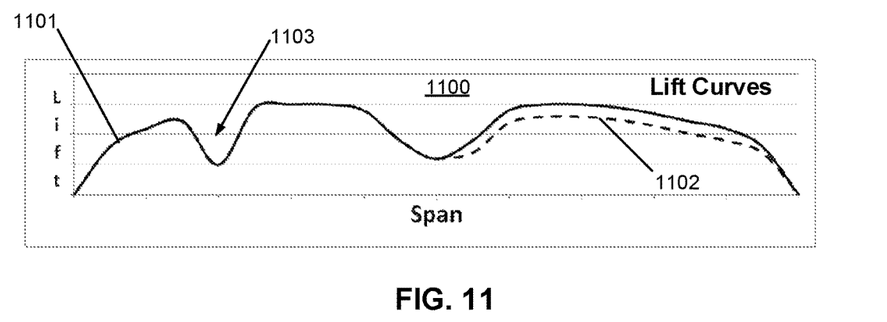
FIG. 11. Curves representing the spanwise distribution of lift for demonstrating how innovative EDF deployment alters lift on one or both wings for situations such as an engine failure.

FIG. 11 illustrates graph 1100 that displays lift curves 1101 and 1102 for a section of a wing, according to some embodiments. Graph 1100 shows how situations like an engine failure, as shown by dip 1103 in the solid lift curve 1101 can be compensated by altering the lift distribution on one wing, represented by dashed lift curve 1102. Although not shown, it is understood by persons skilled in the art that the lift distribution may be similarly altered on both wings. The need for alterations of the lift distribution may be sensed by the ADAHRS 304, autopilot 303 or pilot 302, and automatically compensated by master controller 301, changing the power supplied to other EDFs, or altering the nozzles or trailing edge surfaces.

The synergistic integration of multiple distributed electric ducted fans (EDFs) into the aircraft structure to supply upper surface blowing over a substantial portion of the lifting surface in the manner suggested in the drawings, combined with a control system to manage the individual EDFs, has many advantages for general aviation and other aircraft. The control system senses the state of each EDF, trailing edge surface and nozzle; the aircraft attitude; and the surrounding air conditions. Based on these and signals from a human pilot, an autopilot or internal logic, it manages the electric power provided to each EDF and configuration of trailing edge surfaces, and each EDF's and nozzles. This integration of the master controller unit with the distributed EDFs allows for the novel and improved aerodynamics, reaction to pilot or autonomous commands, virtual elimination of stalls and reduction of the effect of turbulence. Additionally, the instant innovation may improve propulsion efficiency and enhance short take-off and landing (STOL) performance.

Upper surface blowing over a substantial portion of the lifting surface using electric ducted fans has the potential to greatly improve the lift coefficient on a substantial portion of the lifting surface. Where previous upper surface blowing has affected a small portion of the lifting surface area, this concept encompasses a substantial portion of the lifting surface. With flaps stowed (or no flaps at all), in the cruise configuration, a substantial portion of the thrust from the EDFs provide thrust for the aircraft. At the same time and with minimal loss of thrust efficiency, the thrust provides an increased lift coefficient over the wing. This allows for the use of a smaller area for the needed lift force and thus, improved efficiency.

The increased lift coefficient of the airfoil throughout the substantial portion of the lifting surface area allows for a smaller wing area reducing the induced drag and thus effectively increasing the lift/drag ratio of the lifting surface using the same energy as is being used for propulsion.

For landing, takeoff, or other situations needing high lift at low speed, flaps can be deployed (see FIG. 6) on a portion of the trailing edge of the lifting surface. Upper surface blowing over a substantial portion of the lifting surface increases the lift dramatically when compared to traditional flap systems, allowing for improved STOL performance. Since the lift coefficient can be greatly increased with the combination of blowing and flaps across a substantial portion of the lifting surface, there is no need for high angles of attack for short take-off and landing.

This concept offers the benefit of control of pitch, roll and yaw. By varying the electrical power to the individual motors or controlling the nozzles or upper surface, the lift distribution and thrust can be real-time tailored to control the airplane much as an aileron or wing warping (see FIG. 10). This aspect of the instant innovation may allow banking control without the need for ailerons. Similarly, by controlling the thrust along with the nozzles, the lift distribution may be symmetrically maintained while the asymmetric trust may cause the airplane to yaw. Finally, if distributed electric ducted fans are integrated into multiple surfaces of the airplane, for example, the wing and horizontal tail or two tandem wings; then pitch may be controlled by the allocation of power the EDFs or the modification of the flow emanating from them on each surface.

The system also allows real-time lift redistribution to improve ride qualities through active gust alleviation. Here, accelerations to the airframe and relative wind angles can be sensed by the ADAHRS and the lift distribution changed to accommodate gusts offering improved ride qualities. Studies have shown that altering the lift distribution using actively controlled flaps and ailerons reduced accelerations by 15-50% on a Cessna 402B. The current innovation can even have a greater effect on the lift distribution than discrete trailing edge devices (i.e. flaps and ailerons) and thus may give even a greater reducing in accelerations and thus better ride qualities. Gust alleviation can also improve aircraft structure life by reducing the loads on the airframe.

A limitation on the spacing of aircraft when landing is effect of the wake turbulence one airplane has on another aircraft that is trailing it. Wake turbulence is caused by the wing tip vortex shed in creating lift and producing induced drag. Aircraft spacing at airports, and thus the traffic density at them, is determined by safe wake clearance. It has been shown that the sensitivity of wakes to merge and dissipate is sensitive to small changes in the spanwise load distribution. According to the instant innovation, the control system may affect the lift distribution during approach and landing causing wakes to dissipate more rapidly. This may allow airplanes to land closer together increasing the density of air traffic near airports.

A dreaded situation in single engine aircraft is for the engine to quit and a limitation of twin engine aircraft is ability for safe flight on a single engine. This concept allows for a decreased effect of an engine-out situation (see FIG. 10). If there are a high number of EDFs on each wing, according to the instant innovation, the loss of single or even multiple motors can be compensated through the redistribution of power to the remaining EDFs. This aspect of the instant innovation greatly adds to the safety of an electric airplane.

Further, as shown in FIG. 3, this instant innovation greatly lends itself to redundancy not only through the multiplicity of motors, but also easily allows redundancy of controllers 310 and power source 312 configurations. In this aspect, the dreaded engine out situation that can occur with traditional engines would be virtually impossible with a distributed EDF system according to the instant innovation.

By its very nature, the instant innovation helps the flow remain attached to the airfoil and thus makes stalls unlikely. By way of example, if the ADAHRS senses incipient stall at any location on a lifting surface, it can alter the power to the EDF or the configuration of the nozzles to compensate for it the incipient stall by entraining airflow. By managing the lift distribution on a lifting surface in cross winds can be compensated for greatly easing landing and taking off when the wind is not directly aligned with the runway.

There is the potential for great weight savings. On a typical four place general aviation aircraft the engine weighs more than 400 lbs. For a distributed EDF system of, for example, 16 EDFs, the motors, controllers and wiring together will weigh in the range of 50 lbs. This weight is distributed along the span of the lifting surface reducing the weight of the structure. It may be that controllers can be consolidated further lowering this weight. Currently batteries weigh much more than aviation fuel, and the comparison of relative weights of these two power storage mediums is poor. However, battery energy technology is improving rapidly being fueled by the internet of things and automotive markets. It is expected that, in the foreseeable future battery energy density will improve to the point that the total system weight will be competitive. Alternatively, hybrid systems are under development that can supply electricity to the motor using a small internal combustion engine that is much lighter, more fuel efficient and less costly than current engines.

This concept offers a potential great decrease in the initial operating costs of propulsion. For example, a General Aviation aircraft can be powered by 16 ducted fans developed for model airplanes. In the power ranges needed, these generally are available at this time for <$200 each with controllers for each in the same range. This results in a power plant total cost of $6,400 as compared to $25,000 plus for a comparable internal combustion engine. As this concept evolves, controllers will be combined to reduce the cost to <$5000. This does not include the cost of batteries or charging electricity needed to power this concept. Further, the cost of fuel greatly limits the use of general aviation aircraft.

It is to be understood that the foregoing embodiments are exemplary, and that the innovative technology is by no means limited to only the embodiments disclosed herein. Equivalent variations not hitherto disclosed are to be understood as remaining within the scope and the spirit of the instant innovation, as claimed in the claims below.

The invention claimed is:

1. A powered aerodynamic lift device, comprising:
   at least one aerodynamic lifting element or combination of lifting elements each comprising a span, a leading edge, trailing edge, and an upper aerodynamic surface; and
   a plurality of electric ducted fans (EDFs) distributed along the span of said lifting element near the leading edge, wherein the ones of the plurality of EDFs comprises a fan and a channel aft of the fan, wherein the channel extends between the fan and at least one nozzle, wherein the flow of air accelerated by the ones of the plurality of EDFs is to be directed over a portion of the upper aerodynamic surface of the at least one aerodynamic lifting element aft of the at least one nozzle,
   and wherein the power supplied to the ones of the plurality of the EDFs is to be individually controllable such that the spanwise lift and thrust profiles over the upper aerodynamic surface of the aerodynamic lifting element are to be alterable at different locations along the span of the aerodynamic lifting element.

2. The powered aerodynamic lift device of claim 1, wherein the lift and thrust distributions of the air accelerated over a portion of the upper aerodynamic surface of the aerodynamic lifting element aft of each one of the plurality of EDFs are to be independently controllable by changing the electrical power supplied to any one of the plurality of the EDFs.

3. The powered aerodynamic lift device of claim 1, comprising an electronic control circuit coupled to each EDF of the plurality of the EDFs for separately controlling the thrust of each EDF of the plurality of EDFs in response to pilot command input and to sensor input, wherein the pilot command input and the sensor input are coupled to the electronic control circuit, wherein the sensor input comprises the state of each EDF of the plurality of EDFs and the state of the aerodynamic lifting element, and wherein the lift and thrust distributions on the portion of the aerodynamic surface aft of each EDF of the plurality of the EDFs are to be tailored to suit flight requirements.

4. The powered aerodynamic lift device of claim 3, wherein the geometry of the at least one nozzle is controllable by the electronic control circuit coupled to actuators that are coupled to the at least one nozzle to affect the flow angle of air accelerated over the portion of the upper aerodynamic surface aft of the at least one nozzle, and wherein the lift and thrust distributions on the portion of the aerodynamic surface are to be tailored to suit flight requirements.

5. The powered aerodynamic lift device of claim 3, wherein the upper aerodynamic surface comprises a trailing edge aft of the at least one nozzle, and wherein the trailing edge is to be controllable by the electronic control circuit coupled to actuators that are coupled to the trailing edge to affect the flow of air accelerated over the portion of the upper aerodynamic surface aft of the at least one nozzle, and wherein the lift and thrust distributions on the portion of the aerodynamic surface are to be tailored to suit flight requirements.

6. The powered aerodynamic lift device of claim 3, wherein the sensor input comprises any of EDF rotational speed, power utilized by the EDF, air flow rate from the EDF or Air Data/Attitude/Heading Reference System (ADAHRS) measurements, and wherein the electronic circuit is to combine the pilot command input with the sensor input.

7. The powered aerodynamic lift device of claim 3, wherein the electronic control circuit comprises a master controller unit that is coupled to one or more electronic speed controllers coupled to the ones of the plurality of EDFs to control the thrust of the ones of the plurality of the EDFs, and wherein the electronic control circuit is coupled to actuators to regulate the geometric shape of the at least one nozzle, and wherein the lift and thrust profiles are to be alterable at different locations along the span of the aerodynamic lifting element.

8. The powered aerodynamic lift device of claim 3, wherein the electronic control circuit comprises an Aircraft State Module and a Desired State Module that are coupled to a Command Logic Module, wherein the Command Logic Module is to compare data output from the Desired State Module with data output from the Aircraft State Module, wherein the Command Logic Module and an Autonomous Logic Module are coupled to an Amalgamator, wherein the Amalgamator is coupled to one or more electronic speed controllers coupled to the ones of the plurality of the EDFs, and wherein the one or more electronic speed controllers are to regulate the power to the ones of the plurality of EDFs such that the lift and thrust profiles along the span of the lifting element are to be alterable.

9. The system of claim 8, wherein the Amalgamator is coupled to actuators coupled to a trailing edge flap, and wherein the electronic control circuit adjusts the angle of the flap in response to input from sensors coupled to the electronic control circuit.

10. The system of claim 8, wherein the Amalgamator is coupled to actuators that are coupled to the at least one nozzle, and wherein the actuators are to adjust the geometry of the at least one nozzle.

11. A powered aerodynamic lift device, comprising:
    at least one aerodynamic lifting element or combination of lifting elements each comprising a span, a leading edge, trailing edge, and an upper aerodynamic surface; and
    a plurality of electric ducted fans (EDFs) distributed along the span of said lifting element near the leading edge, wherein the ones of the plurality of EDFs comprises a fan and a channel aft of the fan, wherein the channel extends between the fan and the at least one nozzle, wherein the flow of air accelerated by the ones of the plurality of EDFs is to be directed over at least a portion of the upper aerodynamic surface aft of the at least one nozzle, and disposed such that the flow of air accelerated by the fans of the EDFs is to be directed over a portion of the upper aerodynamic surface, and wherein the spanwise lift and thrust profiles over the portion of the upper aerodynamic surface of the aerodynamic lifting element aft of each one of the plurality of EDFs are to be alterable at different locations along the span of the aerodynamic lifting element;
    a trough in the upper aerodynamic surface aft of the EDFs that are to shape the air accelerated by each EDF of the plurality of EDFs over the aerodynamic surface aft of the nozzle; and an electronic control circuit coupled to the at least one nozzle and the trough that is to combine pilot commands with aircraft system information to control the geometry of the at least one nozzle or the trough.

12. The powered aerodynamic lift device of claim 11, wherein the trough is recessed into the upper aerodynamic surface aft of the at least one nozzle, and wherein the sidewalls intersect the upper dynamic surface at sharp angles or the sidewalls are blended with the upper dynamic surface.

13. The powered aerodynamic lift device of claim 12, wherein the sidewalls extend aft of the at least one nozzle and spread apart as they extend away from the at least one nozzle, and wherein, the lift and thrust profiles over the portion of the upper aerodynamic surface aft of the at least one nozzle that is wider than the at least one nozzle are to be alterable.

* * * * *